(12) United States Patent
Kempf et al.

(10) Patent No.: US 9,058,583 B2
(45) Date of Patent: Jun. 16, 2015

(54) SYSTEMS AND METHODS FOR MOBILE ACCESS TO ITEM INFORMATION

(75) Inventors: Dirk Kempf, Walldorf (DE); Norbert Bröker, Rauenberg (DE); Tobias-Alexander Storz, Moosburg an der Isar (DE); Uwe Pfisterer, Sandhausen (DE)

(73) Assignee: SAP SE, Walldorf (DE)

( * ) Notice: Subject to any disclaimer, the term of this patent is extended or adjusted under 35 U.S.C. 154(b) by 25 days.

(21) Appl. No.: 13/605,774

(22) Filed: Sep. 6, 2012

(65) Prior Publication Data

US 2014/0061294 A1   Mar. 6, 2014

(51) Int. Cl.
*G06F 17/00* (2006.01)
*G06Q 10/08* (2012.01)
*G06Q 10/06* (2012.01)

(52) U.S. Cl.
CPC ............... *G06Q 10/08* (2013.01); *G06Q 10/06* (2013.01)

(58) Field of Classification Search
CPC ..... G06Q 10/087; G06Q 30/02; G06Q 30/06; G06Q 10/00; G06Q 30/0601; G06Q 20/20; G06Q 30/0207; G06Q 20/3276; G06Q 30/00; G06Q 30/0222; G06Q 30/0609; G06Q 30/0623
USPC ........................................................ 235/375
See application file for complete search history.

(56) References Cited

U.S. PATENT DOCUMENTS

| | | | |
|---|---|---|---|
| 3,778,911 A | 12/1973 | Woolman | |
| 6,973,622 B1 | 12/2005 | Rappaport et al. | |
| 7,596,508 B1 * | 9/2009 | McGuffie et al. | 705/26.35 |
| 7,756,757 B1 * | 7/2010 | Oakes, III | 705/26.1 |
| 8,413,882 B1 * | 4/2013 | Nidamarthi et al. | 235/375 |
| 8,452,876 B1 | 5/2013 | Williams et al. | |
| 2003/0212766 A1 | 11/2003 | Giles et al. | |
| 2005/0160403 A1 | 7/2005 | Nivelet | |
| 2006/0026558 A1 | 2/2006 | Beringer et al. | |
| 2006/0136583 A1 | 6/2006 | Helmstetter et al. | |
| 2006/0149407 A1 | 7/2006 | Markham et al. | |
| 2006/0293779 A1 | 12/2006 | Nishri | |
| 2007/0162485 A1 | 7/2007 | Haeberle et al. | |
| 2007/0219645 A1 | 9/2007 | Thomas et al. | |
| 2008/0256044 A1 * | 10/2008 | Anderson et al. | 707/3 |

(Continued)

OTHER PUBLICATIONS

"Reverse proxy", Wikipedia®, [Online]. Retrieved from the Internet: <URL: http://en.wikipedia.org/w/index.php?title=Reverse_proxy &printable=yes>, (Acesssed Jul. 3, 2012), 2 pgs.

(Continued)

*Primary Examiner* — Thien M Le
*Assistant Examiner* — Tae Kim
(74) *Attorney, Agent, or Firm* — Schwegman Lundberg & Woessner, P.A.

(57) ABSTRACT

Example systems and methods of mobile access to information for items or objects, such as, for example, product and inventory items found in a warehouse or on a shop floor, are presented. In one example, an identifier is received at a mobile communication device. A search request including the identifier is transmitted from the mobile communication device to an enterprise resource planning system. Information descriptive of at least one item is received at the mobile communication device from the enterprise resource planning system in response to the search request. The information is presented to a user of the mobile communication device.

17 Claims, 16 Drawing Sheets

(56) References Cited

U.S. PATENT DOCUMENTS

| | | |
|---|---|---|
| 2008/0284573 A1 | 11/2008 | Stambaugh et al. |
| 2008/0306985 A1 | 12/2008 | Murray et al. |
| 2009/0013038 A1 | 1/2009 | Vogler et al. |
| 2009/0070173 A1 | 3/2009 | Walker |
| 2009/0144143 A1 | 6/2009 | Iyer |
| 2009/0182600 A1 | 7/2009 | Lungu |
| 2009/0210813 A1 | 8/2009 | Sawczak et al. |
| 2009/0307255 A1 | 12/2009 | Park |
| 2009/0319595 A1 | 12/2009 | Millmore et al. |
| 2010/0070907 A1 | 3/2010 | Harrod et al. |
| 2010/0249955 A1 | 9/2010 | Sitton |
| 2010/0274366 A1 | 10/2010 | Fata et al. |
| 2011/0006114 A1* | 1/2011 | Schueller et al. ............ 235/383 |
| 2011/0029897 A1 | 2/2011 | Russell et al. |
| 2011/0083094 A1 | 4/2011 | Laycock et al. |
| 2011/0087988 A1 | 4/2011 | Ray et al. |
| 2011/0113360 A1 | 5/2011 | Johnson et al. |
| 2011/0153279 A1 | 6/2011 | Zhang et al. |
| 2011/0214050 A1 | 9/2011 | Stambaugh |
| 2011/0276886 A1 | 11/2011 | Hall et al. |
| 2012/0037697 A1* | 2/2012 | Boone et al. ............ 235/375 |
| 2012/0260166 A1 | 10/2012 | Cipollo et al. |
| 2012/0260206 A1 | 10/2012 | Cipollo et al. |
| 2012/0320058 A1 | 12/2012 | Stephen et al. |
| 2013/0027561 A1 | 1/2013 | Lee et al. |
| 2013/0030875 A1 | 1/2013 | Lee et al. |
| 2013/0123963 A1 | 5/2013 | Cooper et al. |
| 2013/0123964 A1 | 5/2013 | Cooper et al. |
| 2013/0191878 A1 | 7/2013 | Mani et al. |
| 2013/0198691 A1 | 8/2013 | Akita |
| 2013/0226451 A1 | 8/2013 | O'neill et al. |
| 2013/0288719 A1 | 10/2013 | Alonzo |
| 2014/0049402 A1 | 2/2014 | Beaulieu et al. |
| 2014/0068445 A1 | 3/2014 | Kempf et al. |

OTHER PUBLICATIONS

"Sybase® Unwired PlatformMobile Enterprise Application Platform" Copyright © 2011 Sybase, Inc., (2011), 3 pgs.

"U.S. Appl. No. 13/605,797, Examiner Interview Summary mailed Sep. 24, 2014", 5 pgs.

"U.S. Appl. No. 13/605,797, Response filed Oct. 10, 2014 to Non Final Office Action mailed Jul. 16, 2014", 16 pgs.

"U.S. Appl. No. 13/605,797, Non Final Office Action mailed Jul. 16, 2014", 17 pgs.

"U.S. Appl. No. 13/605,797, Final Office Action mailed Jan. 28, 2015", 24 pgs.

* cited by examiner

SYSTEMS AND METHODS FOR MOBILE ACCESS TO ITEM INFORMATION

BACKGROUND

A multitude of businesses, especially manufacturers, distributors, retailers, and other entities that deal in goods or items, often maintain a warehouse, shipping department, shop floor, or other area in which goods or items are received, manufactured, assembled, boxed, and/or shipped. Oftentimes, many different types of items that may be in various states of processing are located in close proximity as a result of efficient use of shop or warehouse floor space. To help identify each item, the entity owning the workspace may employ barcodes, QR codes, or other visual forms of identification to label the items, the shelves upon which the items are stored, the general area in which the items are located, and the like.

However, even with the use of such identification as a safeguard, difficulties may still arise. For example, an item may be mistakenly placed in a particular area of the workspace. A manager or other employee may subsequently happen upon the unfamiliar item and want to determine the origin or status of the item. In that case, the discovering employee may write down the identifying number of the item, walk to a computer workstation, enter the number as part of a database query, and read the resulting information stored in the database that is associated with the item. Many other examples exist in which the status, origin, or other information regarding an item is useful, and such examples occur with regularity within a single shop or warehouse floor.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Figure 1:
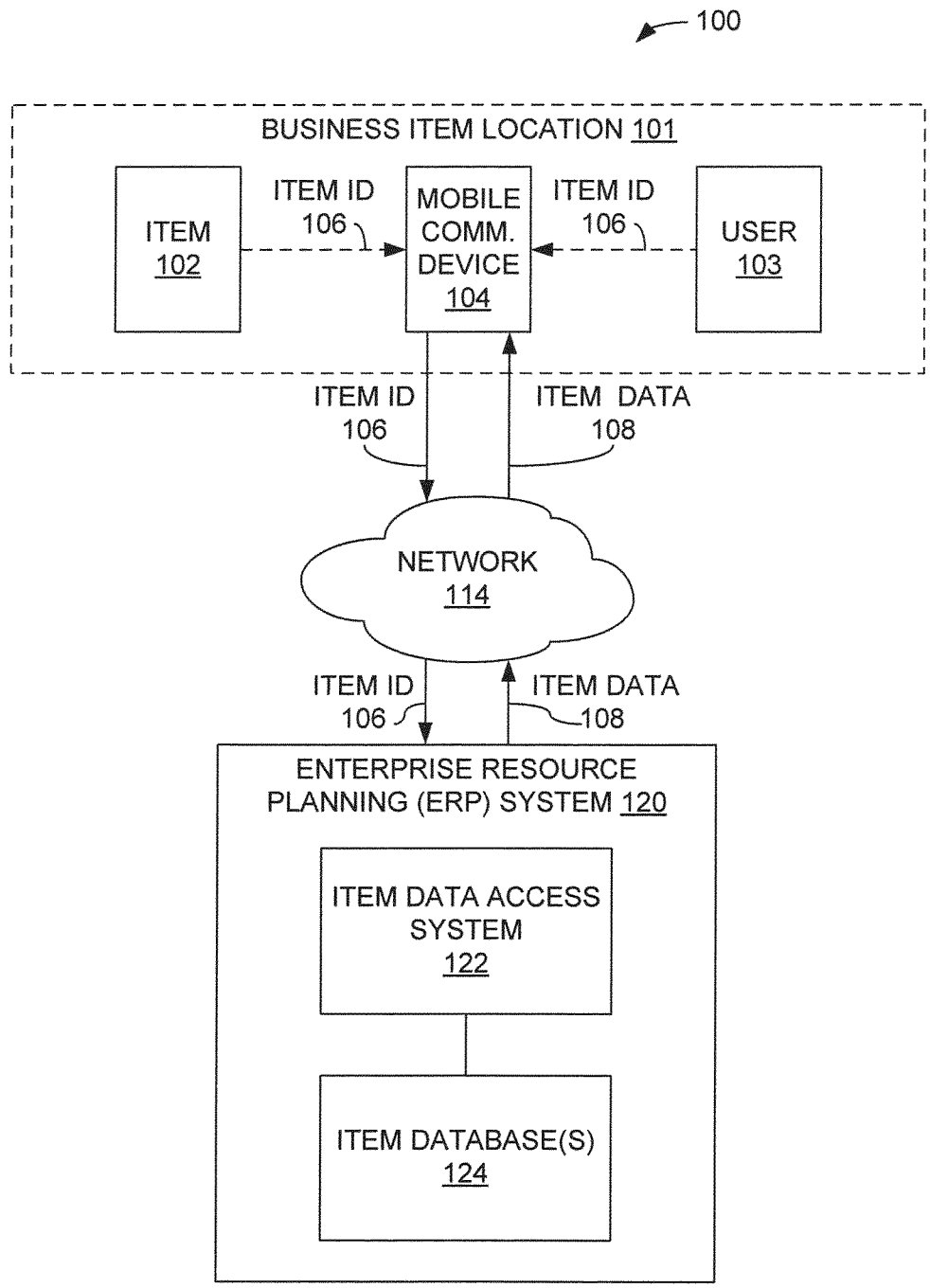
FIG. 1 is a block diagram of an example system for retrieving item information using a mobile communication device.

FIG. 1 is a block diagram of an example system 100 for retrieving item information using a mobile communication device. Generally, the system 100 includes a mobile communication device 104 that may communicate with an enterprise resource planning (ERP) system 120, such as an ERP system provided by SAP AG of Walldorf, Germany. Generally, the ERP system 120 may facilitate and manage the generation and modification of, and user access to, numerous types of data across a business enterprise or organization. Such data may include, but are not limited to, data concerning raw manufacturing materials, finished products, sales and marketing activities, enterprise finances, corporate taxes, employee compensation and benefits, and the like. Accordingly, the ERP system 120 may host applications relating to, for example, product lifecycle management, supply chain management, customer relationship management, corporate financial management, human resources activities, and so on. To facilitate at least some of these applications, the ERP system 120 may include an item data access system 122 and one or more item databases 124 relating to objects or items associated with an enterprise or entity. Such items may include, for example, finished goods and materials used in the assembly of finished goods, the finished goods, and machinery and other infrastructure employed by the enterprise.

Examples of the mobile communication device 104 may include, but are not limited to, smart phones, personal digital assistants (PDAs), tablet computers, and laptop computers. As a result, the mobile communication device 104 may be capable of communicating wirelessly with other communication devices, including the ERP system 120. In at least some of the examples described below, the mobile communication device 104 may also include an image capture device or other component capable of capturing or receiving a graphical representation of an identifier 106 for an item 102, such as an item of inventory, an item of material for manufacturing purposes, and so on. In other examples, a user 103 of the mobile communication device 104 may enter the item identifier 106 directly into the mobile communication device 104, such as by way of a keypad, touchscreen, microphone, and the like.

As shown in FIG. 1, the mobile communication device 104 may be located at a business item location 101, such as a warehouse, a manufacturing or shop floor, shipping department, and so on, each of which is typically associated with a plethora of items of different types. While the embodiments discussed below presume such an environment, other examples are not restricted to such a location 101.

As depicted in FIG. 1, the mobile communication device 104 may transmit the item identifier 106 via a communication network 114 to the ERP system 120 described above. In one example, the item identifier 106 is transmitted as part of a search request to the ERP system 120 to retrieve data 108 describing the item 102. In one example, the network 114 may be a local area network (LAN), a wide area network (WAN, such as the Internet or an Intranet), a cell phone network (such as a 3G (third generation) or 4G (fourth generation) network), or some other communication network, including combinations thereof. As discussed more fully below, the item data 108 may include data retrieved from the item databases 124 that pertain specifically to the item 102, to a customer or production order involving the item 102, to a "batch" of items including the item 102 that were manufactured at the same time using the same or similar process, equipment or machinery employed at the location 101, and so on.

Thus, in at least some examples of the system 100, a user of the mobile communication device 104 may scan or otherwise capture or enter an identifier 106 associated with an item 102, such as a barcode, quick response (QR) code, serial number, or the like, and quickly retrieve information describing or pertaining to the item 102, possibly allowing the user to initiate some action, such as remedying a problem on a manufacturing floor, finding a proper location for the item 102, if misplaced, and so on. Further, such information is accessible to the user without requiring the user to return to a standard computer system located in an office that is remote to the manufacturing floor, thus saving additional time. Other aspects of the embodiments discussed herein may be ascertained from the following detailed description.

Figure 2:
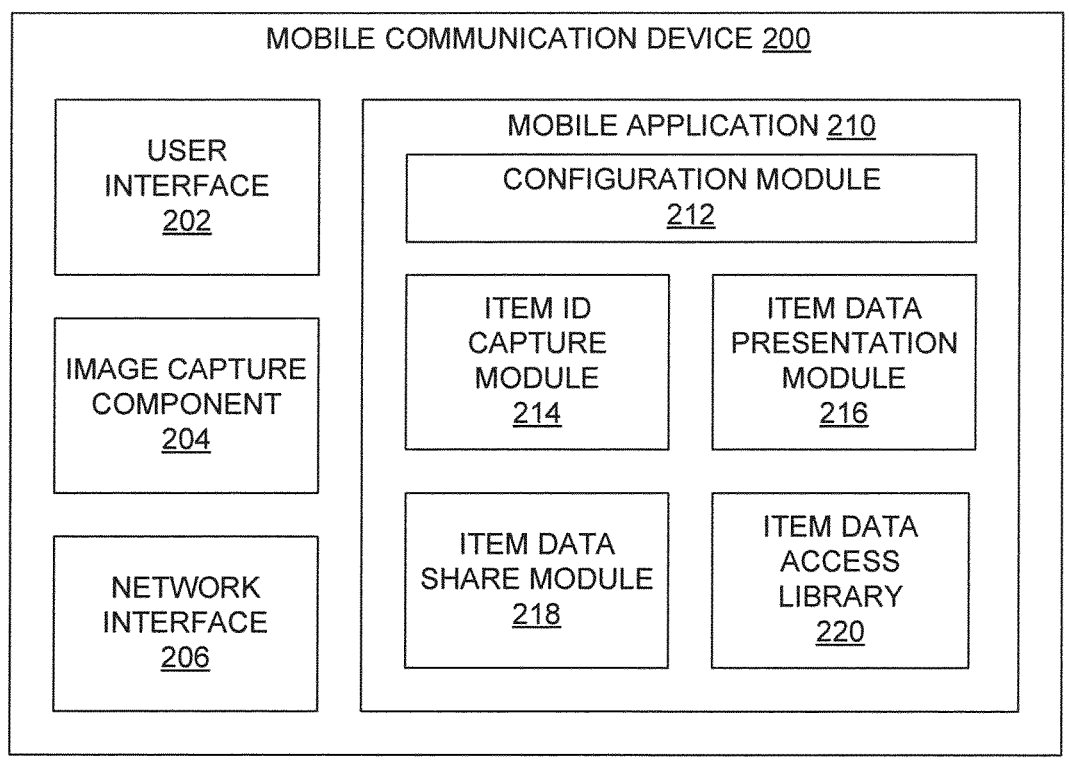
FIG. 2 is a block diagram of an example mobile communication device employable in the system of FIG. 1.

FIG. 2 is a block diagram of an example mobile communication device 200 employable as the mobile communication device 104 in the system 100 of FIG. 1. As shown in FIG. 2, the mobile communication device 200 may include a user interface 202, an image capture component 204, and a network interface 206. Also possibly included is a mobile application 210 to be executed on one or more processors of the mobile communication device 200. In the example of FIG. 2, the mobile application 210 may include several modules, including a configuration module 212, an item identifier capture module 214, an item data presentation module 216, an item data share module 218, and an item data access library 220. In other implementations, greater or fewer numbers of modules may be included in the mobile communication device 200.

The user interface 202 may receive commands from the user, such as a search request for information describing a particular item or group of items associated with an item identifier (e.g., the item identifier 106 of FIG. 1). The user interface 202 may also present to the user such information (e.g., the item data 108 of FIG. 1) received as a result of the search request. The user interface 202 may also allow other types of input and output between the user and the mobile communication device 200. In one example, the user interface 202 may include one or more of a touchscreen, a keypad, a microphone, a display component, a headphone jack, one or more speakers, and the like.

The image capture component 204 may be a camera, scanning element, or other component capable of capturing an image of a graphical representation of an item or object identifier, such as a bar code, a quick response (QR) code, a set of alphanumeric characters, and so on. In embodiments in which the image capture component 204 is not present, a user of the mobile communication device 200 may enter the item identifier manually via a touchscreen or keyboard, orally via a microphone, or via some other means provided by the user interface 202.

The network interface 206 may allow the mobile communication device 200 to communicate with other systems or devices, such as another mobile communication device and the ERP system 120 of FIG. 1. In one example, the network interface 206 may be a wireless network interface, such as an IEEE 802.11b/g/n (WiFi) interface, or a cellular 3G or 4G interface. In another example, the network interface 206 may also include a wired interface, such as an Ethernet or Universal Serial Bus (USB) interface.

The configuration module 212 of the mobile application 210 may receive user input via the user interface 202 to configure one or more aspects of the mobile application 210. In one implementation, the configuration module 212 may receive a selection of a particular business item location 101, such as a specific warehouse or shop floor, or a particular section thereof, at which the mobile communication device 200 is located. By providing this selection, the user may limit or focus the scope of search requests transmitted from the mobile communication device 200 to those items which are present at the selected location. In another embodiment, the particular business item location 101 may be set based on a geographical location determined by a Global Positioning System (GPS) circuit or similar means located in the mobile communication device 200. The user may select other preferences for the mobile application 210 in other examples, such as display formatting preferences, data entry preferences, image capture preferences, and so on.

The item identifier capture module 214 may receive a graphical representation of an item identifier 106 from the image capture component 204 and determine the item identifier 106 being represented. In some implementations, the item identifier capture module 214 may include a sub-module for each type of graphical representation that may be analyzed. For example, the item identifier capture module 214 may include any of a barcode interpreter sub-module for barcode images, a QR interpreter sub-module for QR images, and an optical character recognition (OCR) sub-module for images of alphanumeric characters, to mention a few.

The item data access library 220 may provide utilities by which the mobile communications device 200 may format or generate a search request including an item identifier 106 to be transmitted via the network interface 206 to the ERP system 120. The item data access library 220 may also receive item information or data 108 describing one or more items associated with the item identifier 106 and interpret or format that data 108. The item data presentation module 216 may then format the item data 108 or information for display to the user via the user interface 202. In some examples, such as those illustrated in FIGS. 6A through 6J, the type of information displayed may be directed by the user via the user interface 202.

The item data share module 218, based on receiving an input from the user via the user interface 202, may generate a communication message in which the item identifier 106, as well as other item data 108, is automatically pre-populated in the message. The user may then add additional information or text in the generated message before the user initiates transmission of the message. Examples of the message include an email message and a Short Message Service (SMS) text message. More specifically, in the case of the user requesting generation of an email message, the item data share module 218 may open an email client provided by the mobile communication device 200 and automatically populate at least one of the subject line and the text body with the item identifier 106, and possibly other item data 108. For a user requesting generation of a text message, the item data share module 218 may open an SMS client provided in the mobile communication device 200 and automatically populate the text message with the item identifier 106, and possibly other item data 108. In each type of message, a photo or image of the particular item involved may also be included.

Figure 3:
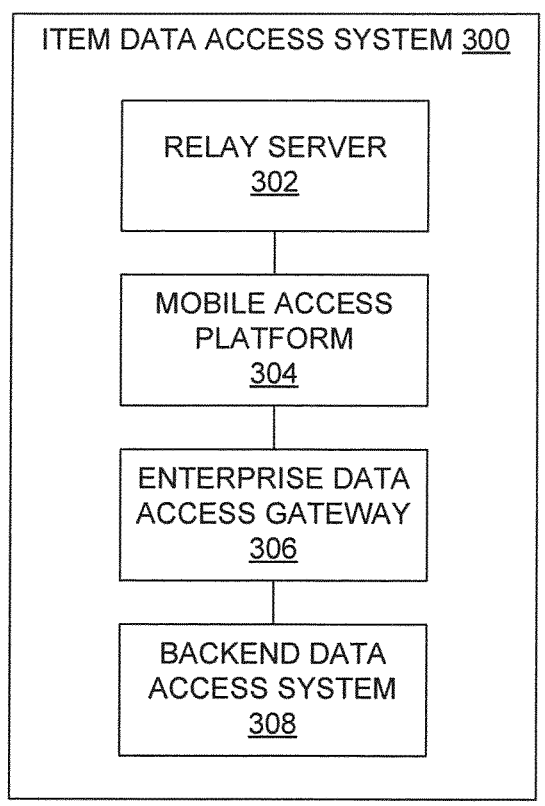
FIG. 3 is a block diagram of an example item data access system employable in the system of FIG. 1.

FIG. 3 is a block diagram of an example item data access system 300 employable as the item data access system 122 of the ERP system 120 of FIG. 1. As shown in FIG. 3, the item data access system 300 may include a relay server 302, a mobile access platform 304, an enterprise data access gateway 306, and a backend data access system 308. In other embodiments, less than all of these components may be employed and/or other components not specifically discussed herein may be included.

The relay server 302 may direct incoming search requests from the mobile communication device 104 to the mobile access platform 304 described below. The relay server 302 may also direct other incoming communication traffic, such as traffic not sourced by a mobile communication device, to other servers or platforms provided by the ERP system 120. In some environments, the relay server 302 may be considered as a type of reverse proxy server capable of directing different types of communication traffic to the particular system or group of systems capable of handling and processing the traffic.

The mobile access platform 304 may provide or facilitate functionality associated with mobile communications. One example of this functionality is user "onboarding," in which the mobile access platform 304 facilitates initial uses of the system 100 by a user, such as by providing step-by-step instructions for setting up a user identity or logon onto the system, or for performing basic functions provided by the system 100, such as the issuing of the search requests discussed above. The mobile access platform 304 may also perform any user or device authentication to allow the user to access the item data 108 or information stored in the ERP system 120. Other functions, such as push notifications for notifying the user of the mobile communication device 104 of special events or errors occurring in the ERP system 120, may also be provided by the mobile access platform 304.

The enterprise data access gateway 306 may convert or reformat incoming communications, such as the search requests noted above, into communications understandable by the underlying backend data access system 308. As a result, multiple ERP systems 120 may be accessed by a mobile communication device 104 presuming the presence of an enterprise data access gateway 306 associated with each ERP system 120 to be accessed. More specifically, each enterprise data access gateway 306 may translate the incoming communications associated with the protocol associated with the mobile access platform 304 to a particular data protocol employed in the backend data access system 308.

The backend data access system 308, upon receiving a search request as discussed above, may perform a search of one or more item databases 124 using the item identifier 106 noted in the search request. In one example, the functionality of the search may be controlled by other information in the search request (e.g., the identity of the particular business item location 101 in which the mobile communication device 104 is located), by the identity of the mobile application 210 being executed in the mobile communication device 104, and by other information or factors accessible by the backend data access system 308. The item databases 124 being accessed by the backend data access system 308 may include databases associated primarily with design engineering, production engineering, test engineering, marketing, sales, and other organizations serviced by the ERP system 120. The resulting item data 108 or information may take many forms, depending on the ERP system 120, including, but not limited to, database entries, text or word processing documents, spreadsheets, and so on.

The backend data access system 308, in response to the search request, may then return the appropriate data indicated by the search request to the mobile communication device 104 via the enterprise data access gateway 306, the mobile access platform 304, the relay server 302, and the communication network 114.

Figure 4:
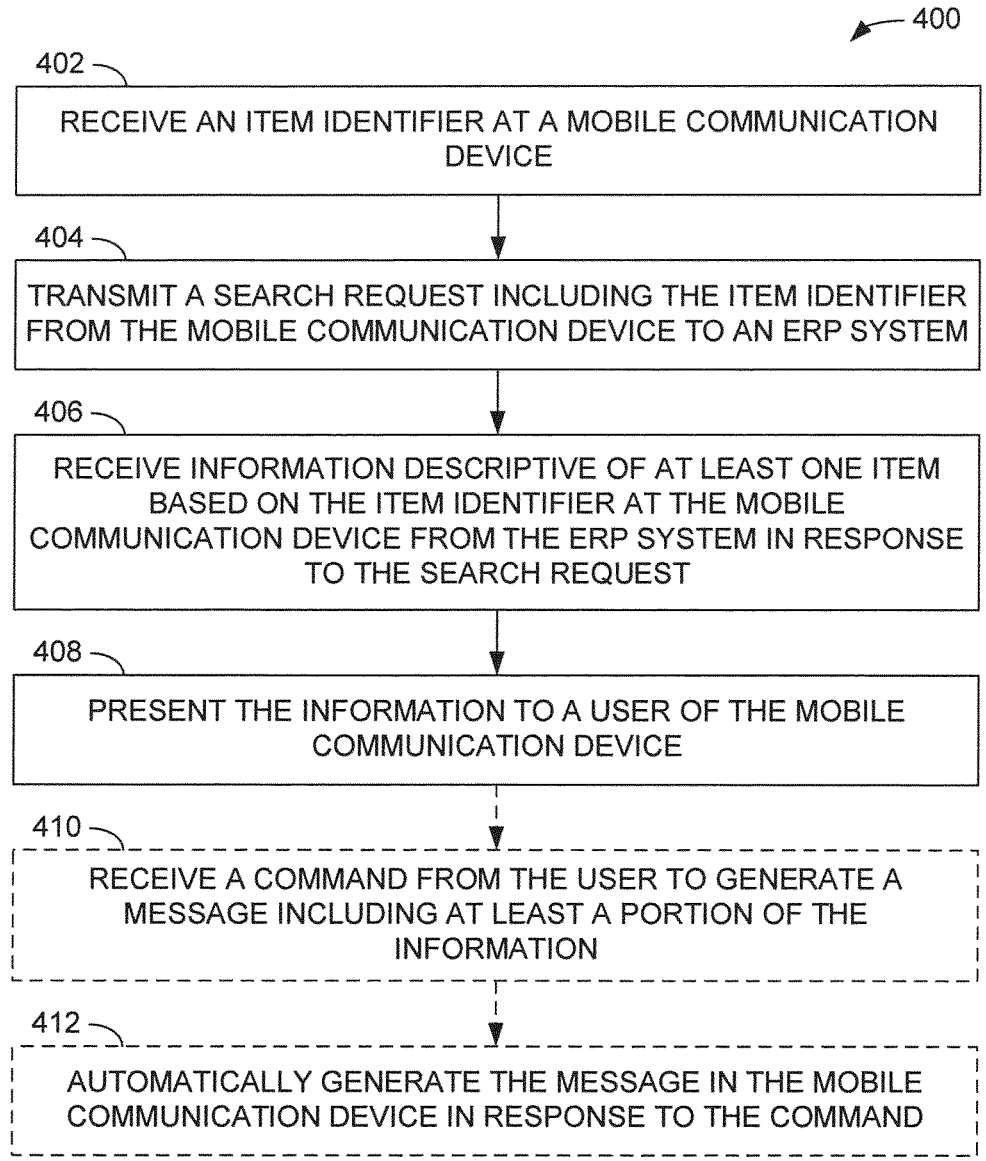
FIG. 4 is a flow diagram illustrating an example method of retrieving, and possibly disseminating, information describing an item.

FIG. 4 is a flow diagram illustrating an example method 400 of retrieving, and possibly disseminating, information or data describing an item, such as the item 102 of FIG. 1. In the method 400, an item identifier (e.g., the item identifier 106 of FIG. 1) may be received at a mobile communication device (e.g., the mobile communication device 104 of FIG. 1) (operation 402). In one example, the mobile communication device 104 scans a graphical representation of the item identifier 106 and determines the item identifier 106 from the graphical representation, as described above. A search request may then be transmitted from the mobile communication device 104 to an ERP system (e.g., the ERP system 120 of FIG. 1) (operation 404). The search request may include the item identifier 106 in at least some implementations, possibly along with additional information.

Item information (e.g., the item data 108 of FIG. 1) descriptive of at least one item (e.g., the item 102 of FIG. 1) may then be received at the mobile communication device 104 from the ERP system 120 in response to the search request (operation 406). As is described more fully below, the item information may include, but is not limited to, information regarding the item 102, a group of items 102 manufactured as a batch, and an order including or specifying the item 102. The item information or item data 108 may then be presented to a user of the mobile communication device 104 (operation 408).

In some examples, the user may initiate the transmission of a message regarding the item data 108 to a remote communication device, such as another mobile communication device possessed by a coworker. To this end, the mobile communication device 104 may receive a command from the user to generate a message including at least a portion of the item data 108 (operation 410). In an example, the message may be an email message, a text message, or the like. In response to the command, the mobile communication device 104 may generate the message automatically (operation 412), such as by opening a messaging client provided in the mobile communication device 104. Also, the mobile communication device 104 may automatically populate the message with the item identifier 106 and/or at least a portion of the item data 108 (which may include the item identifier 106). The user may then add to the message before initiating the transmission of the message to the remote communication device.

While the operations 402 through 412 of the method 400 of FIG. 4 are shown in a specific order, other orders of operation, including possibly concurrent or continual execution of at least portions of one or more operations, may be possible in some implementations of method 400, as well as other methods discussed herein.

Figure 5:
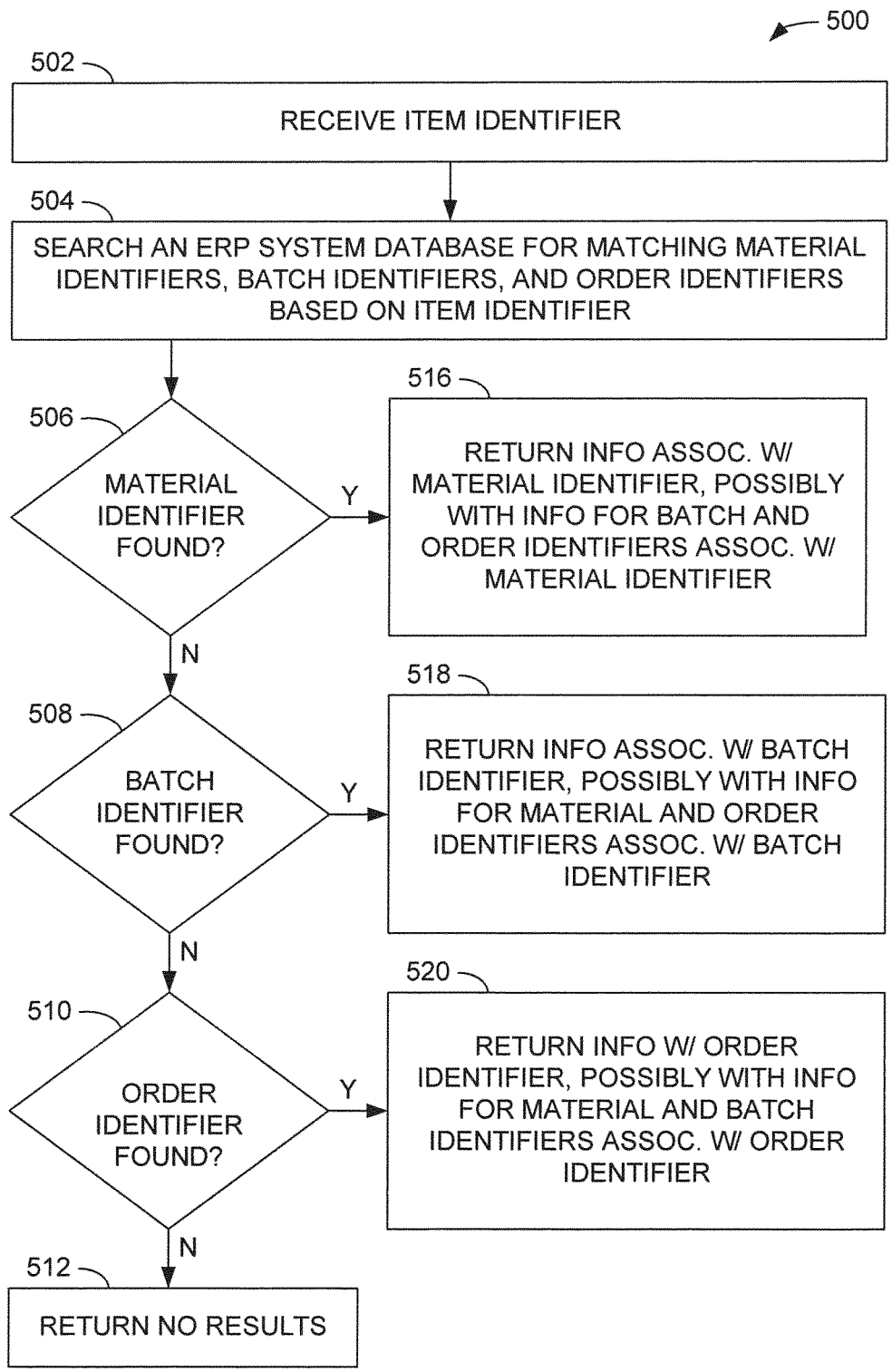
FIG. 5 is a flow diagram illustrating an example method of searching a database associated with an enterprise resource planning system for information describing an item based on a received identifier for the item.

FIG. 5 is a flow diagram illustrating an example method 500 of searching a database (e.g., the item database 124 of FIG. 1) associated with an enterprise resource planning system (e.g., the ERP system 120 of FIG. 1) for information (e.g., the item data 108 of FIG. 1) describing an item (e.g., the item 102 of FIG. 1) based on a received identifier (e.g., the item identifier 106 of FIG. 1) for the item. In the method 500, the item identifier 106 is received at the ERP system 120 (operation 502), and the appropriate database is searched for one or more matching identifiers (operation 504), such as a material identifier, a batch identifier, and/or an order identifier. In the particular examples discussed herein, a material identifier or number identifies a particular item or group of items, such as a single object, a subassembly, or a completed assembly. A batch identifier or number identifies a group of items of the same type that were manufactured or processed at the same time using the same process. An order identifier or number identifies a customer or production order for one or more items or objects. In one example, a successful search for information involves an exact match between the item identifier 106 and one or more identifiers provided in the ERP system 120. In other embodiments, identifiers in the ERP system 120 matching the item identifier 106 closely, but not exactly, may also yield information pertaining to the matched identifiers in the ERP system 120.

Continuing with the method 500, if the ERP system 120 discovers a material identifier during the search (operation 506), information associated with the material identifier is returned (operation 516) possibly along with information for any batch and/or order identifiers associated with the material identifier. For example, if the discovered material identifier is one of a batch of items, or is specified by, or is otherwise part of, a customer or production order associated with an order identifier, these batch and/or order identifiers, as well as information related to these identifiers, may be returned.

Similarly, if the item identifier 106 does not match any material identifiers in the consulted database 124 (operation 506), but does match at least one batch identifier (operation 508), information associated with the batch identifier is returned (operation 518), possibly along with information for any material and/or order identifiers associated with the batch identifier. Further, if the item identifier 106 does not match any batch identifiers (operation 508) but instead matches at least one order identifier (operation 510), information associated with the order identifier is returned (operation 520), possibly along with information for any material and/or batch identifiers associated with the order identifier. Otherwise, if the item identifier 106 does not match any material, batch, or order identifier, no search results may be returned (operation 512).

While the method 500 of FIG. 5 deals specifically with material, batch, and order numbers associated with items or materials typically found in a warehouse or shop floor environment, other types of items or objects corresponding to other environments, such as items for sale in a retail environment, or equipment and machinery employed in a business or enterprise, may benefit from application of the various techniques described herein.

Continuing with the shop floor model, FIGS. 6A through 6J provide example display screenshots presented on a touchscreen or similar display component of a mobile communication device 600 (which may be an example of the mobile communication device 200 of FIG. 2) by an application (e.g., the mobile application 210 of FIG. 2) executing on the mobile communication device 600 for retrieval of information associated with an item. In an example, execution of the mobile application 210 may be initiated by activating an icon on a touchscreen display of multiple application icons representing applications loaded on the mobile communication device 600. In some examples, such a display may be termed a "home screen". In some implementations, the mobile application 210 may prompt the user of the mobile communication device 200 to enter a username, a password, and/or other information that may be used for verification and/or authentication by an ERP system (e.g., the ERP system 120 of FIG. 1) of the user or the mobile communication device 600 to permit the user to access the ERP system 120.

Presuming any initial entry of user or other information has been completed, the mobile application 210 may present a search screen 601A through which a user may scan a graphical representation of a material, batch, or order identifier, such as one that may be displayed on an item, a shelf or container storing such an item, or another structure. In the screen 601A, a current capture image 604 is presented to the user, thus allowing the user to orient the mobile communication device 600 to allow an integrated camera, scanner, or other component to capture the graphical representation of the identifier. As described above, examples of the graphical representation may include a barcode, a QR code, a set of alphanumeric characters, and the like.

In some embodiments, the search screen 601A may also provide an identifier entry field 602 into which the user may manually enter the item identifier in question. Alternatively, the user may speak the item identifier into a microphone of the mobile communication device 600. In either case, the identifier entry field 602 may display each character of the item identifier as the character is entered or spoken into the mobile communication device 600. Further, once a graphical representation is scanned or otherwise optically captured, the mobile application 210 may display the resulting identifier in the identifier entry field 602. In some examples, the search screen 601A may provide a selectable area which the user may activate once the identifier of interest has been entered or scanned to initiate a search request involving the identifier. In other implementations, the determination of the identifier in the mobile communication device 600 may automatically initiate the search request.

The search screen 601A may also present an identifier history area 606 providing several (e.g., ten) of the most recent identifiers or numbers that were scanned or entered into the mobile communication device 600, thus allowing the user to retrieve information related to those identifiers again at a later time. In the specific example of FIG. 6A, the identifier history area 606 displays a material number entry 616 with an associated material icon 610 and an order number entry 618 associated with a particular material number, as well as an order icon 612. Each icon 610, 612 may provide the user with an easily recognized visual cue to the nature of the associated identifier (e.g., a material number, a batch number, or an order number).

Figure 6A:
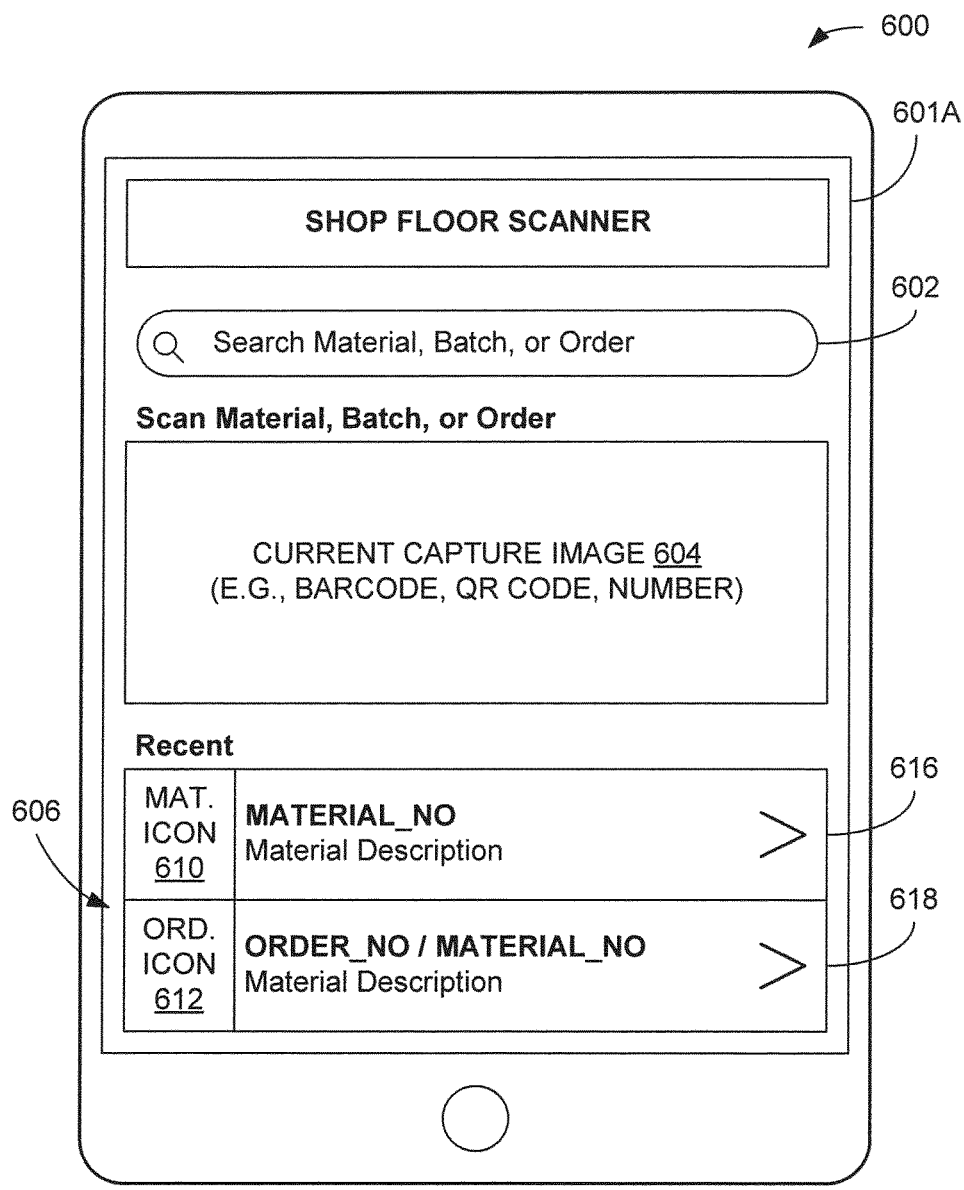
FIGS. 6A through 6J provide example mobile communication device display screenshots provided by an application executing on the mobile communication device for retrieval of information associated with an item.
Figure 6B:
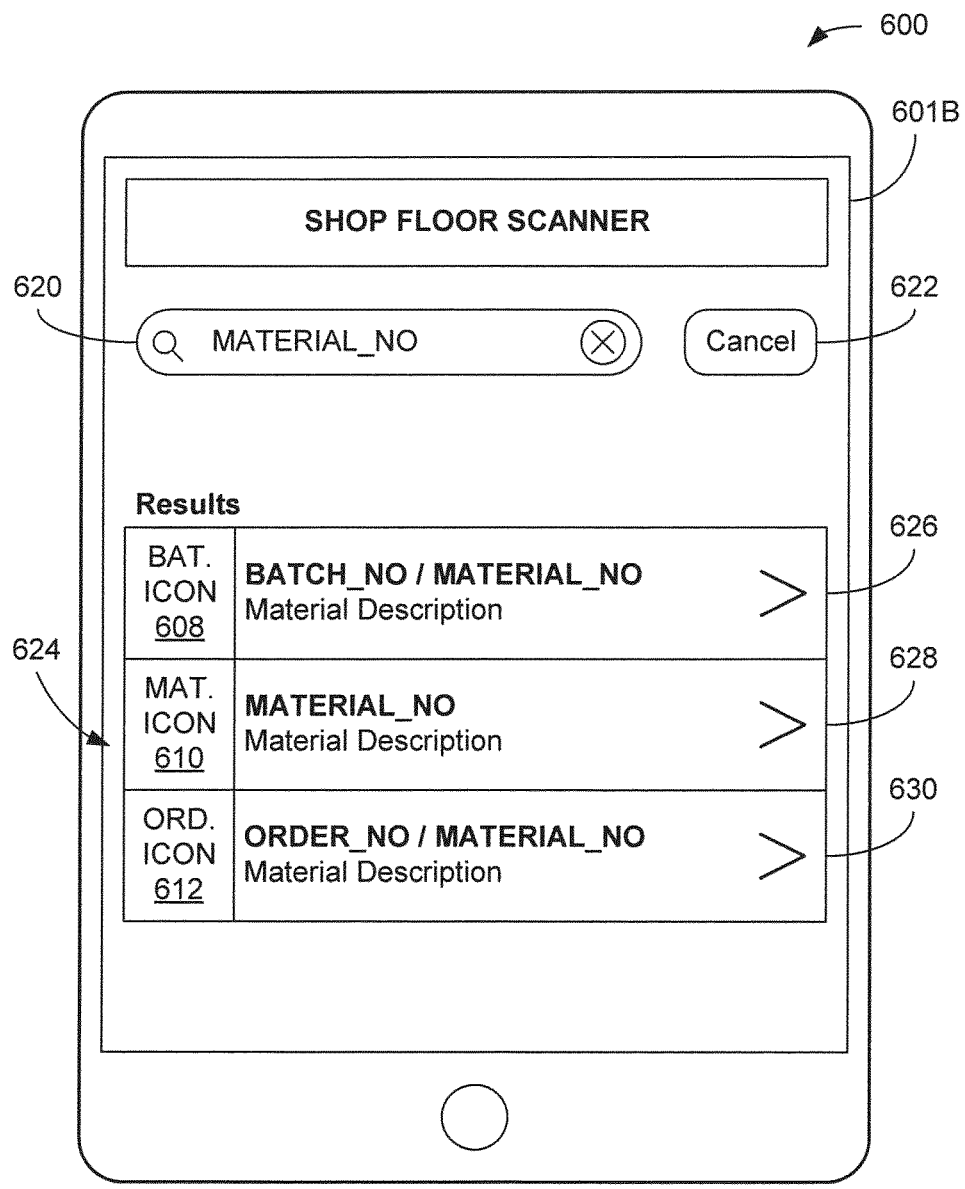
Figure 6C:
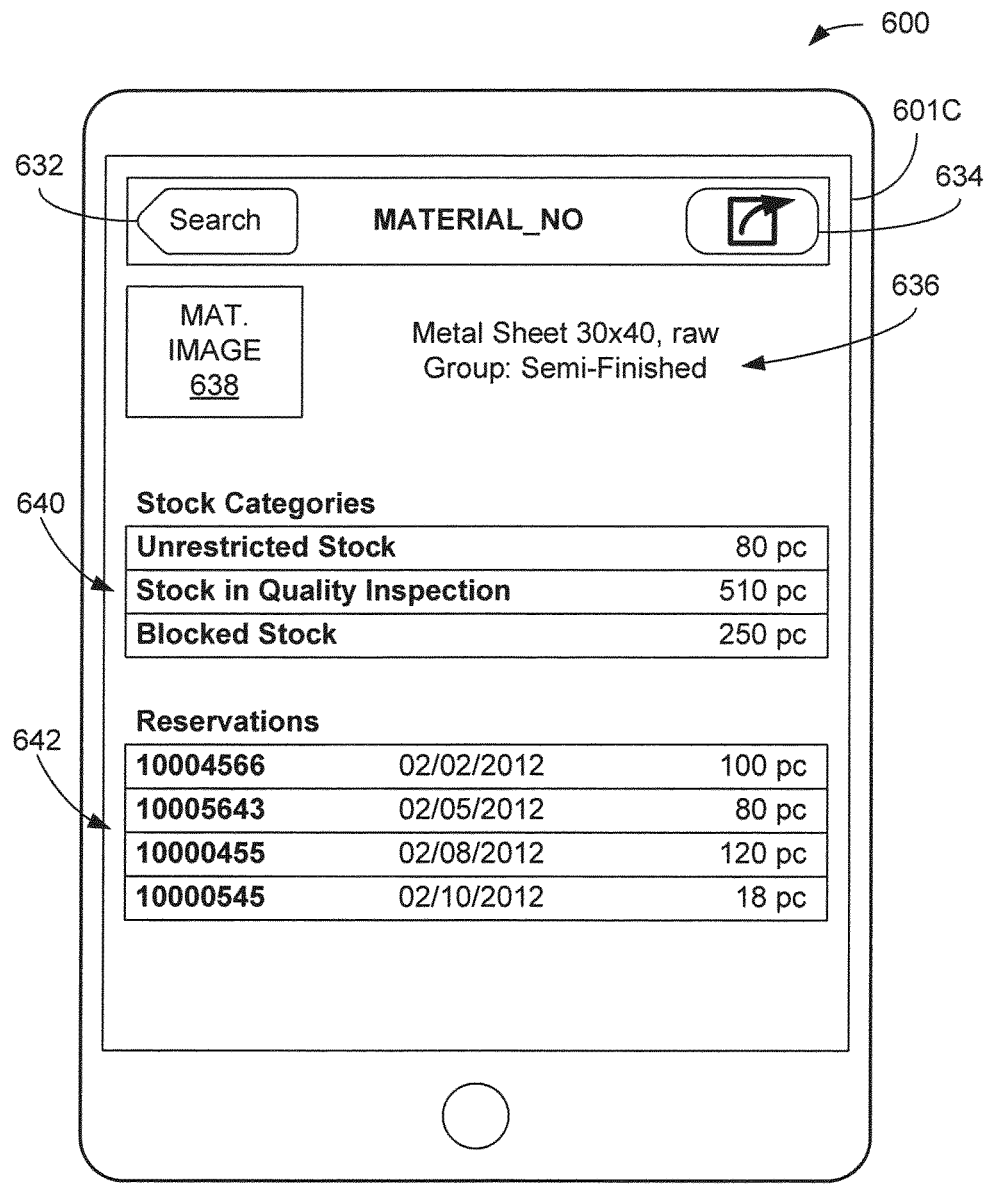

Presuming that an identifier for a material or item has been scanned or entered into the search screen 601A, a results screen 601B, as depicted in FIG. 6B, may be presented to the user. In this case, an entered identifier field 620 may be presented that displays the material identifier or number used in the search request transmitted from the mobile communication device 600 to the ERP system 120. The information returned from the ERP system 120 may be displayed in a results area 624. In this particular case, three different results have been returned: a batch number result 626 associated with the entered material number, a material number result 628 for the entered material number, and an order number result 630 associated with the entered material number. In addition, each of the results 626, 628, 630 may be graphically coupled with an icon indicating the type of result: a batch icon 608, a material icon 610, or an order icon 612 to facilitate rapid recognition by the user of the type of result 626, 628, 630 being returned.

In addition, user activation of any of the results 626, 628, 630 may result in presentation on the display of more detailed information returned by the ERP system 120 in response to the search request involving the entered or captured item identifier. In one example, at least some of this information may not be returned from the ERP system 120 to the mobile communication device 600 until the user activates the associated result 626, 628, 630. Examples of screens showing such detailed information are presented in FIGS. 6C through 6G.

In one example, activation of the 'X' icon in the entered identifier field 620 may clear the identifier in the entered identifier field 620, thus yielding no results in the results area 624. Thereafter, a new item identifier may be entered in the entered identifier field 620 in some examples to produce new results. The results screen 601B may also incorporate a cancel button 622 that, when activated by the user, may return the user to the search screen 601A of FIG. 1A.

In response to the user activating the material number result 628 of FIG. 1B, the mobile application may present a material results screen 601C as depicted in FIG. 1C. In one example, the material results screen 601C may present a material description area 636, possibly along with a material image 638 associated with the material number of interest. The material description area 636 may provide a brief description of the material (e.g., "Metal Sheet 30×40, raw; Group: Semi-Finished). The material image 638 may be a photograph, simple rendering, or other representation of the material item in question.

An example of the material results screen 601C may also provide more descriptive information regarding the items related to the material number. In the specific example of FIG. 6C, the material results screen 601C includes a stock categories area 640 providing an indication of the number of pieces (denoted "pc" in FIG. 6C) of the particular item or material that are associated with a particular material category (e.g. 80 pieces of "unrestricted stock", 510 pieces of "stock in quality inspection", and 250 pieces of "blocked stock"). The material results screen 601C, as shown, may also include a reservations area 642 indicating a number of reservations for the particular material items currently in stock, including a reservation number (e.g., 10004566), a date of the reservation (e.g., Feb. 8, 2012), and a number of pieces of the item being reserved (e.g., 100 pieces). The reservations may be have been made for a particular customer as items for sale, for inclusion in a larger assembly to be sold to a customer, or for other purposes. Other or different information aside from that depicted in FIG. 6C relating to a particular item or material may be presented in other embodiments.

Also included in the material results screen 601C may be a search button 632 that, when activated, may return the user to the search screen 601A. The material results screen 601C may also provide a share button 634 that, when activated, provides a share screen illustrated in FIG. 6H to facilitate the sending of a message regarding the material or item, as described in greater detail below.

In one implementation, the material results screen 601C is presented if the selected material result 628 is not associated with a batch. If, instead, the selected material result 628 is associated with a batch, or if the user selects the batch result 626 of the results screen 601B, the mobile application 210 may present the batch-oriented material results overview screen 601D of FIG. 6D. In this example, the batch-oriented material results overview screen 601D may provide a batch identifier field 650 including the batch number or identifier associated with the material number in addition to the material description area 636 and the material image 638. The information provided by the batch-oriented material results overview screen 601D for a specific batch number may thus be directed specifically to the indicated batch.

Figure 6D:
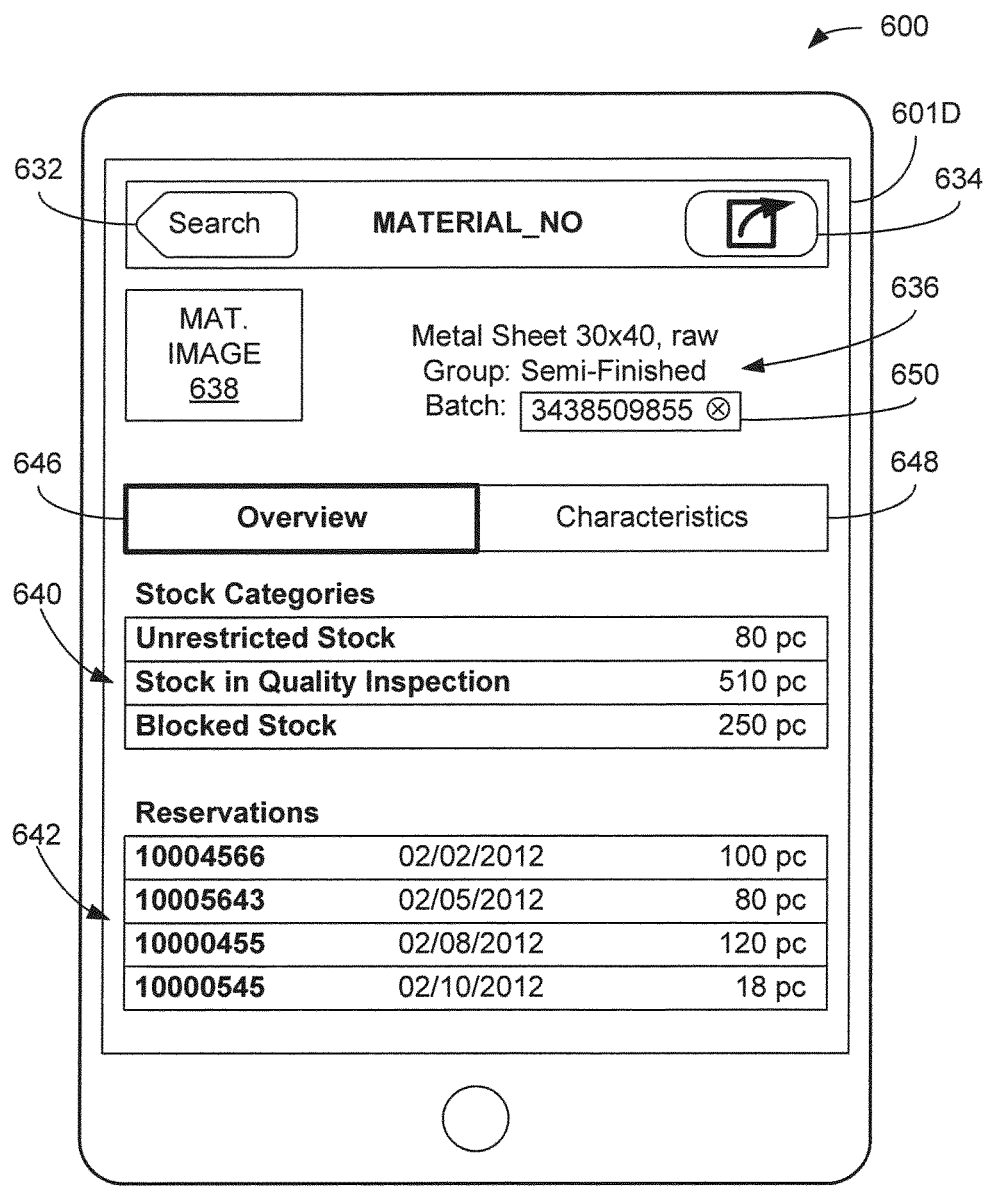

The batch-oriented material results overview screen 601D may also provide, in this example, user-selectable access to either the batch-oriented material results overview screen 601D of FIG. 6D via activation of an overview button 646, or a batch-oriented material results characteristics screen 601E (depicted in FIG. 6E) via activation of a characteristics button 648. In the example described herein, the batch-oriented material results overview screen 601D provides information similar to that shown in material results screen 601C for non-batch materials, but applied only to those materials corresponding to the indicated batch number. Alternatively, if the batch identifier field 650 is cleared, such as by way of the included 'X' icon, the information provided in the overview screen 601D would be applicable to all materials, regardless of batch number. Also, the characteristics button 648 may be "grayed out" (e.g., inactivated), as the characteristics may be batch-specific.

Figure 6E:
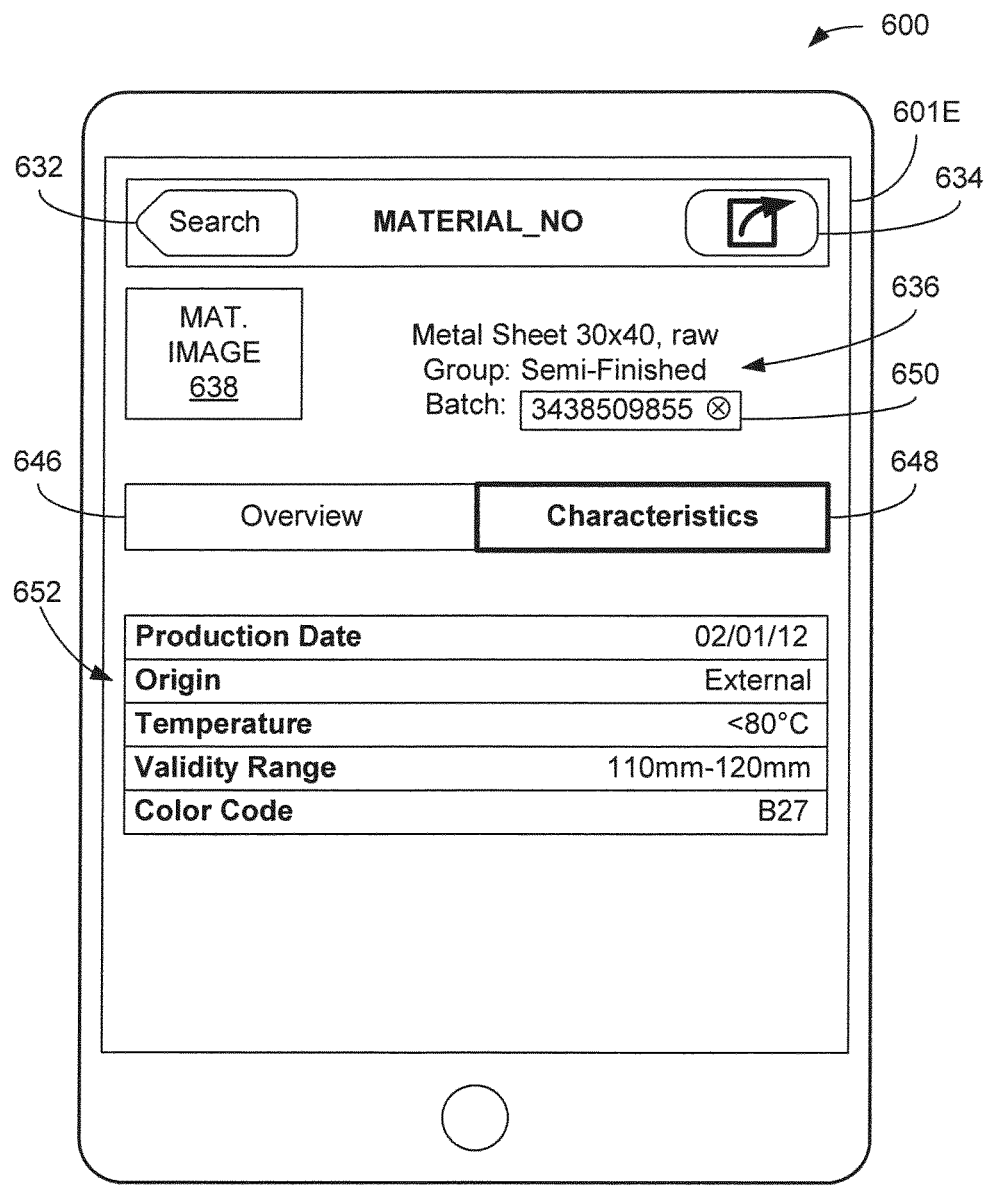

In response to activation of the characteristics button 648 of the batch-oriented material results overview screen 601D, the mobile application 210 may display the batch-oriented material results characteristics screen 601E of FIG. 6E. In that screen 601E, several characteristics applicable to the indicated batch of materials or items may be presented in a characteristics area 652. Examples of the characteristics displayed may include, for example, a production date for the batch (e.g., Feb. 1, 2012), an origin of the batch (e.g., "external"), a temperature at which the batch was manufactured or processed (e.g., "80° C."), a validity range of the batch (e.g., 110 mm (millimeters) to 120 mm), and a color code (e.g., "B27"). The characteristics displayed for a particular material batch may be based at least in part on the particular type of material involved.

In both the batch-oriented material results overview screen 601D and the batch-oriented material results characteristics screen 601E, the search button 632 may facilitate a return to the search screen 601A, and the share button 634 may facilitate the generation of a message involving the batch-oriented material indicated.

Figure 6F:
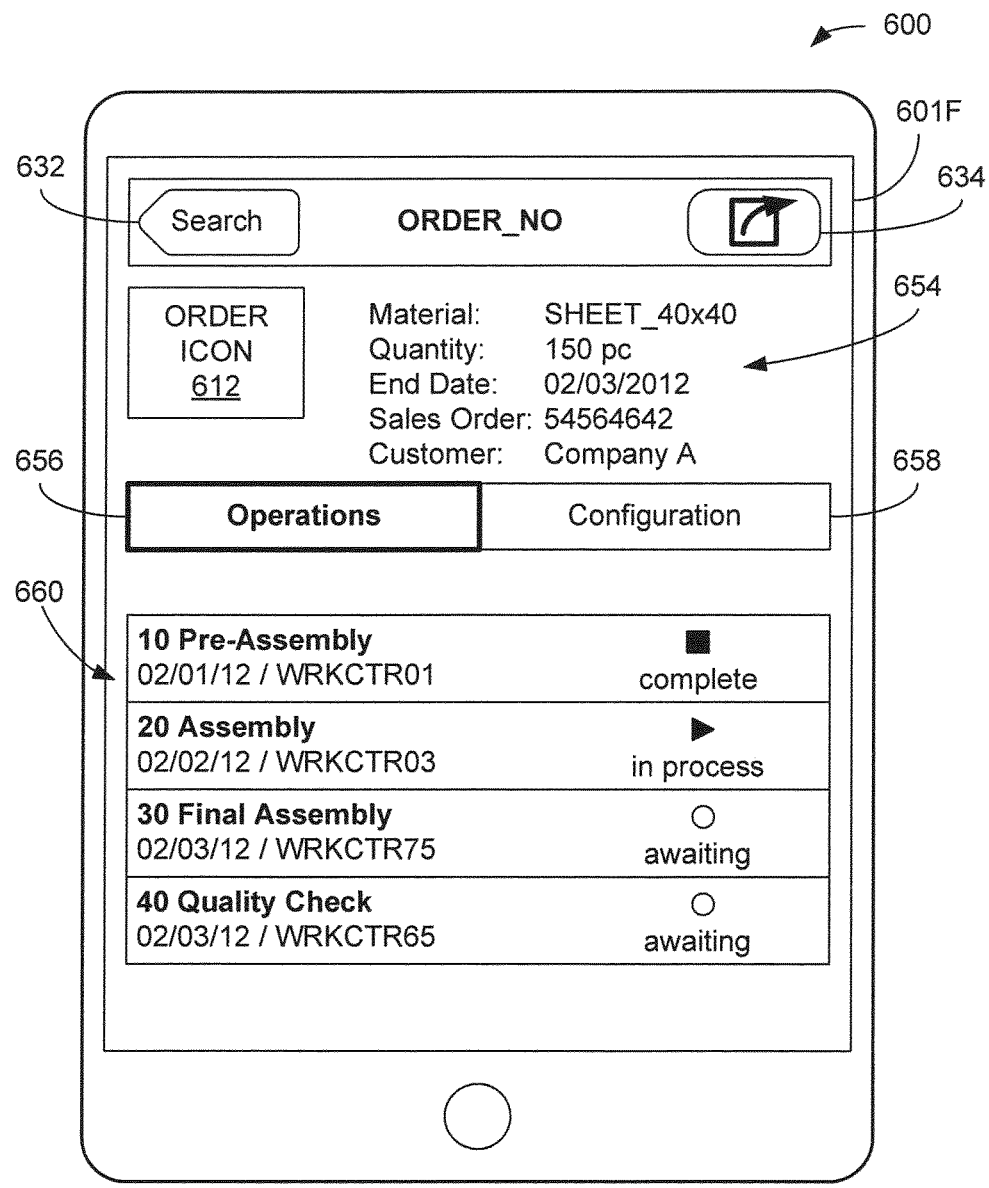
Figure 6G:
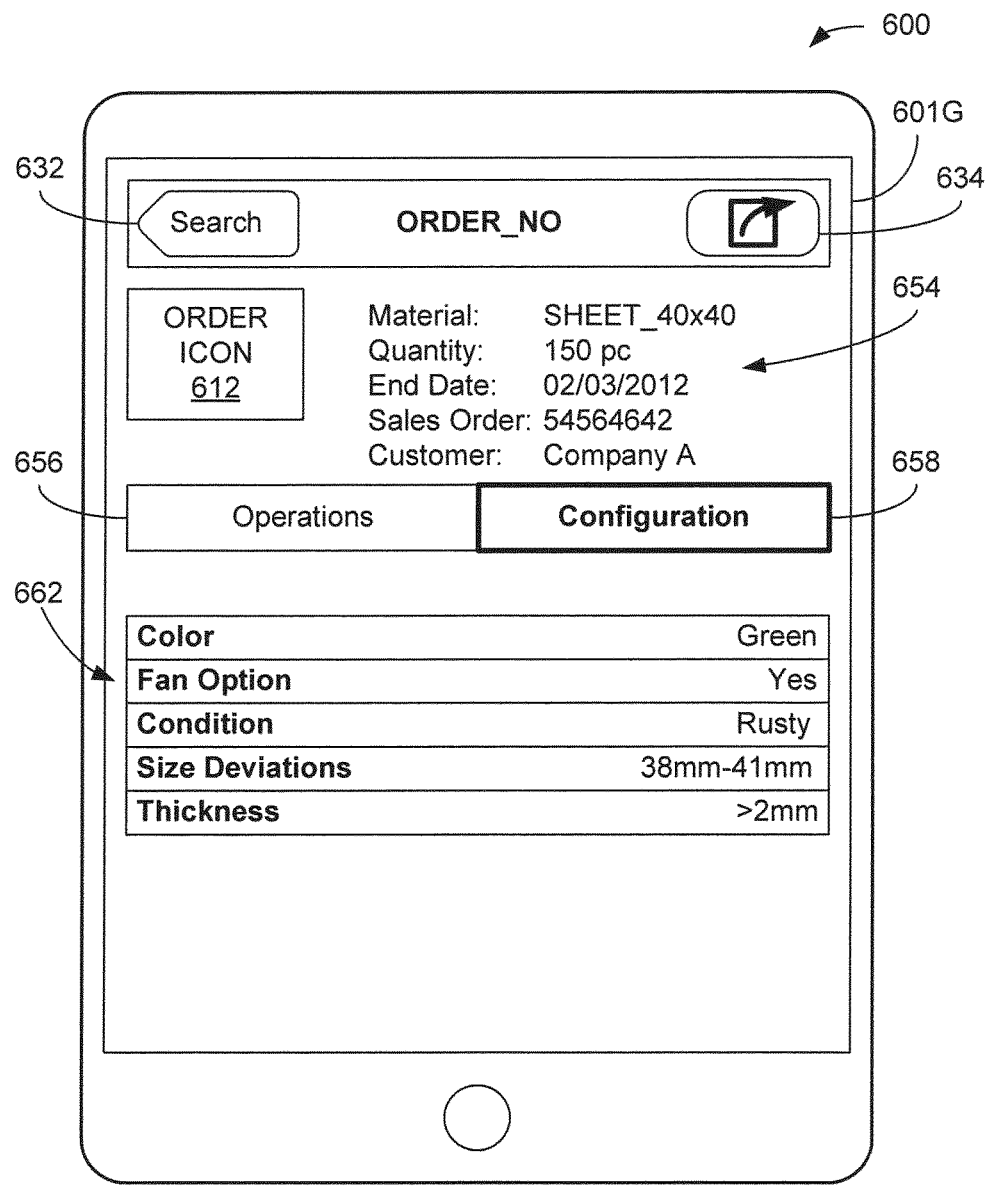

Returning to the results screen 601B, a user selection of the order number result 630 may result in the mobile application 210 presenting to the user an order operations screen 601F depicted in FIG. 6F. In this screen 601F, an order description area 654 may provide information related to the particular order, such as, for example, the material involved (e.g., "SHEET_40×40"), a quantity of items in the order (e.g., 150 pieces), a date at which the order is scheduled to be completed (e.g., "Feb. 3, 2012"), a sales order number (e.g., "54564642"), and an ordering customer (e.g., "Company A"). The order operations screen 601F may also display the order icon 612 mentioned above.

The order operations screen 601F may also provide an operations information area 660 describing one or more operations (e.g., "10 Pre-Assembly", "20 Assembly", "30 Final Assembly", and "40 Quality Check") which have been, or are to be, applied to the materials involved to complete the items that are the subject of the order. Additionally, in association with each operation, a scheduled date for the operation, the work-center (e.g., "WRKCTR01") scheduled to perform the operation, and the current progress of the operation (e.g., "complete", "in process", and "awaiting") may be presented to the user.

The user may select the particular information displayed for a specified order by way of an operations button 656 and a configuration button 658. Selection of the operations button 656 may cause presentation of the order operations screen 601F, including the operations information area 660, while selection of the configuration button 658 may cause the display of an order configuration screen 601G depicted in FIG. 6G. In this implementation, the order configuration screen 601G may display the order description area 654 and the order icon 612, along with a configuration description area 662, which may indicate various configuration options selected the specific order. Examples of the configuration options displayed in FIG. 6G include a color of the material (e.g., "green"), a fan option (e.g., "Yes"), a condition of the material (e.g., "Rusty"), size deviations of the material (e.g., 38 mm to 41 mm), and a thickness (e.g., ">2 mm"). The specific types or categories displayed in the configuration description area 662 may depend at least in part on the type of material associated with the order number.

As with at least some of the previous screens described above, the order operations screen 601F and the order configuration screen 601G may also include the search button 632 and the share button 634 discussed earlier. Presuming user activation of the share button 634 from any of the screens of FIGS. 6C through 6G, the mobile application 210 may present a share screen 601H shown in FIG. 6H. In this particular example, the share button 634 was activated from the material results screen 601C, which causes a portion of the screen to be overlaid graphically by three selection buttons: an email button 664, an SMS button 668, and a cancel button 670. A user selection of the cancel button 670 may cause the area containing the three buttons 664, 668, 670 to be removed to reveal the entirety of the material results screen 601C. Selection of the email button 664 may cause the mobile application 210 to display an email screen 601I depicted in FIG. 6I, while selection of the SMS button 668 may prompt the display of an SMS screen 601J shown in FIG. 6J.

Figure 6H:
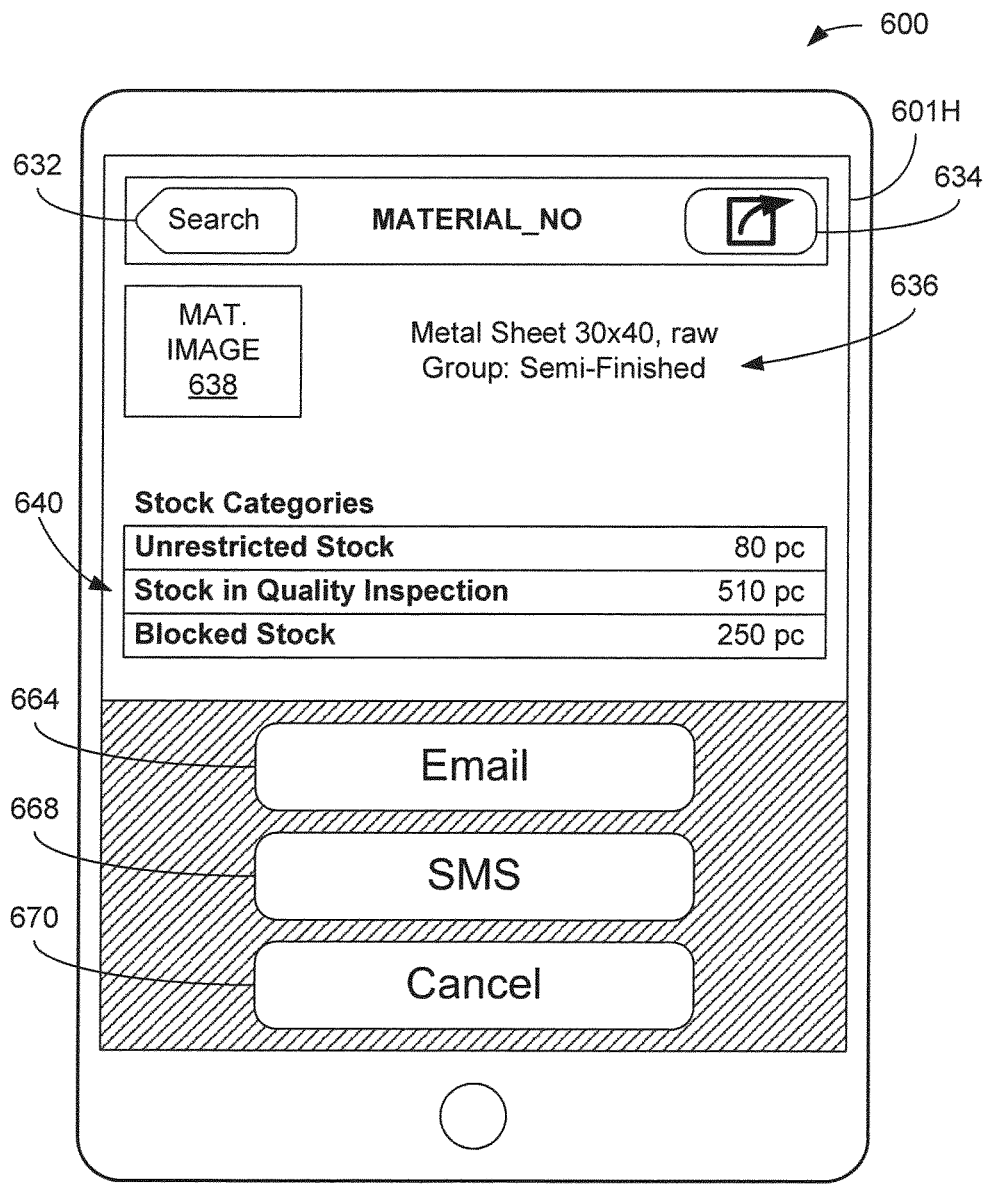
Figure 6I:
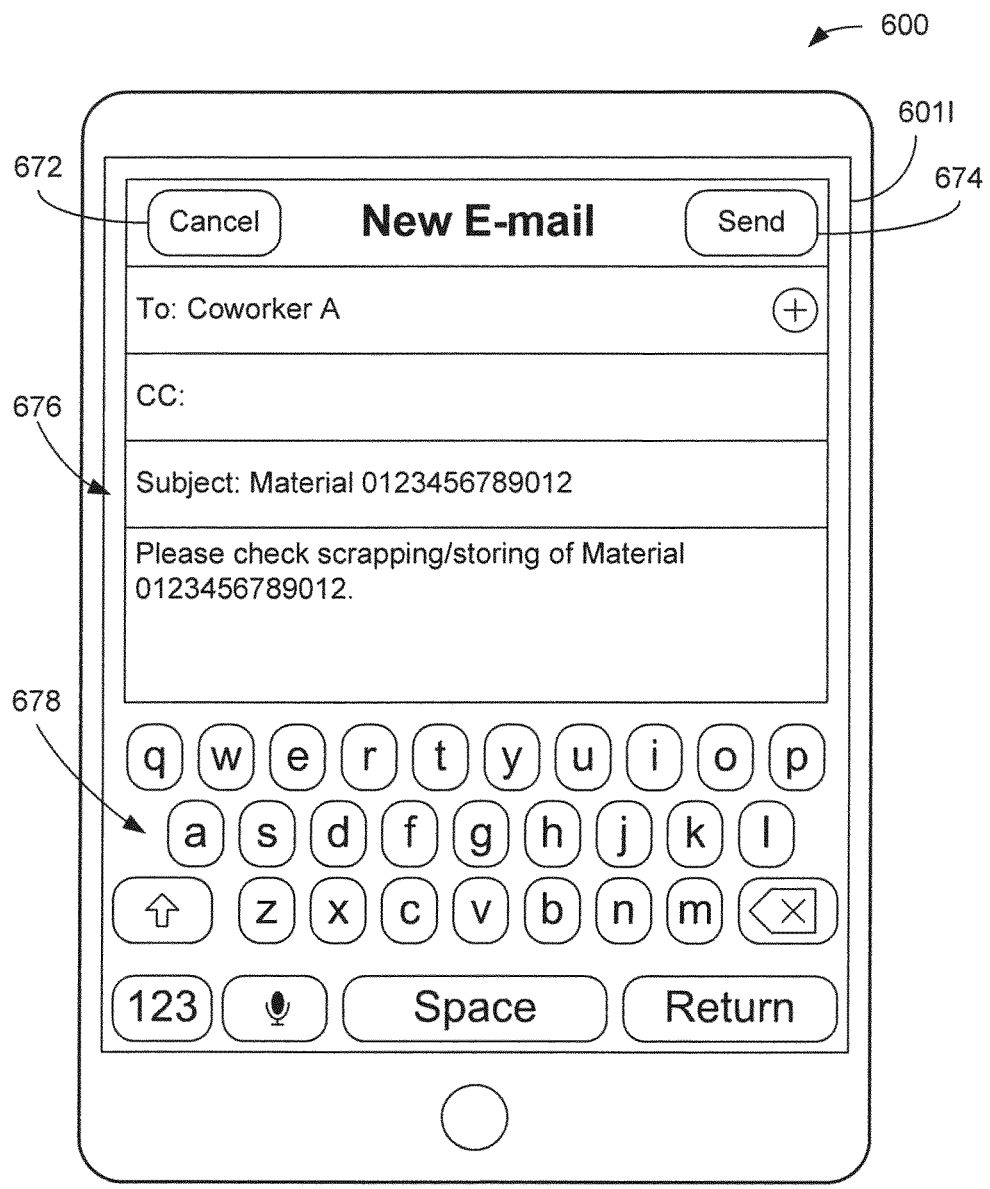

As shown in FIG. 6I, the mobile application 210 may open an email client, such as one that may be normally provided in the mobile communication device 200, to generate an email message. The email client may provide a cancel button 672 to cancel generation of the message, as well as a send button 674 to send the message once the message is complete. The email client may also provide an email area 676 including typical "to", "cc", and message fields. The mobile application 210 may automatically populate the subject field and/or the message field with the material, batch, or order identifier (e.g., "Material 0123456789012"). In other examples, any other information returned by the ERP system 120 (e.g., information displayed in the various screens 601B through 601G) may also be populated in the message automatically. The user may then supplement the message using a keyboard 678 provided by the email client (e.g., "Please check scrapping/storing of") and address the message (e.g., "Coworker A"), as shown in FIG. 6I. User activation of the send button 674 may then initiate transmission of the completed message via the email client.

Figure 6J:
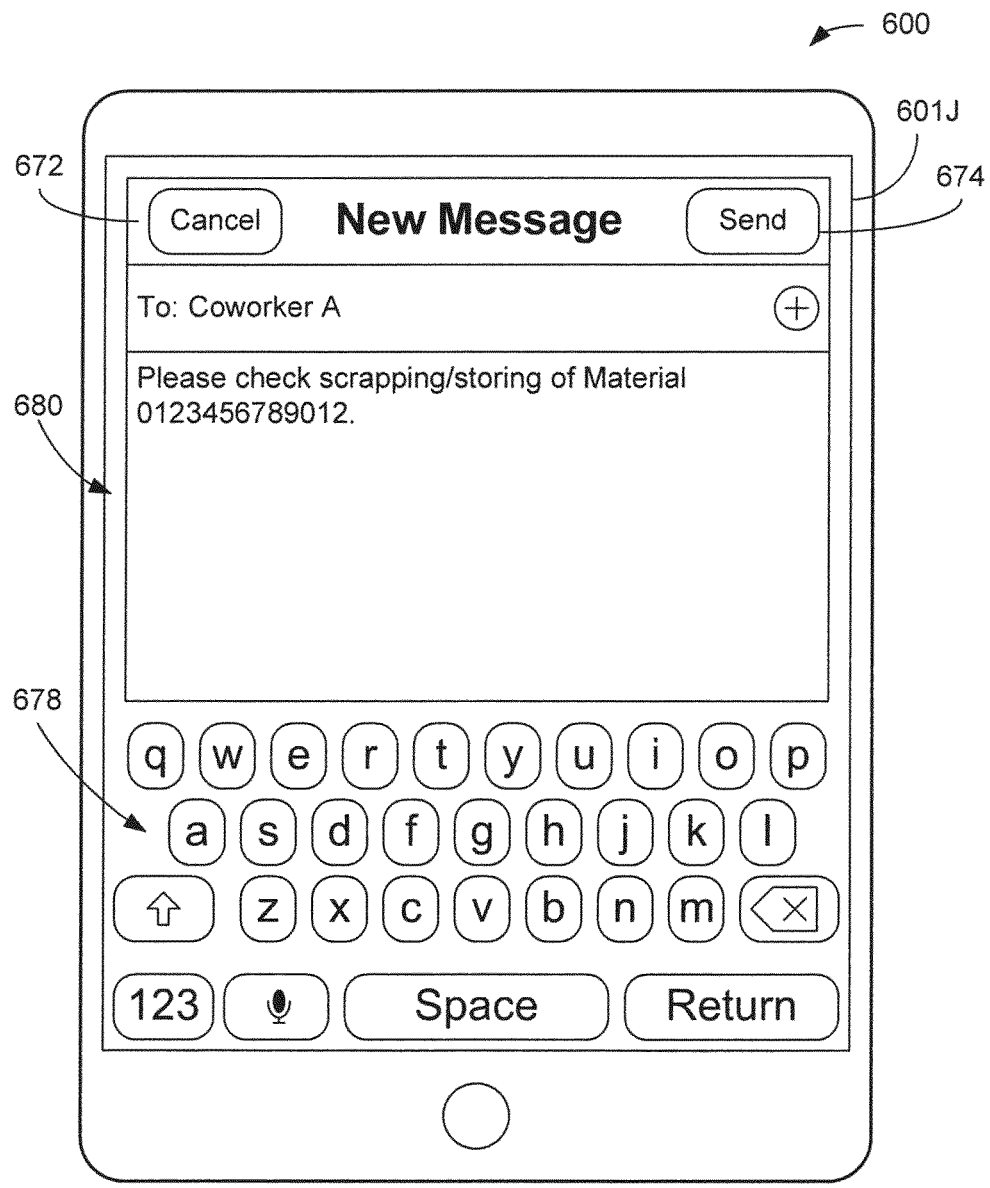

Similarly, in response to activation of the SMS button 668 of FIG. 6H, the mobile application 210 may open an SMS client providing the SMS screen 601J of FIG. 6J. In addition to the cancel button 672, the send button 674, and the keyboard 678 of FIG. 6I, the SMS client may also provide a text area 680 in which the mobile application 210 has populated the material, batch, or order identifier (e.g., "Material 0123456789012"), possibly along with any of the other information returned from the ERP system 120 as described above. Once the user has augmented the message with additional text (e.g., "Please check scrapping/storing of") and addressed the text (e.g., "Coworker A"), the user may then activate the send button 674 to transmit the message.

While the email and SMS clients described above are provided in the mobile communication device 200 external to the mobile application 210, these clients may be supplied within the mobile application 210 as additional modules in other examples.

As a result of at least some of the embodiments described above, a user may employ a mobile communication device (e.g., the mobile communication device 104 of FIG. 1) to conduct a search of a corporate database regarding a particular item, batch of items, or a customer or production order immediately by merely scanning or otherwise entering an identifier associated with the item, batch, or order in question. Such quick access to relevant information may allow the user to answer any questions or resolve any problems quickly, which may be important in a quick-paced environment, such as a shop floor, shipping department, or warehouse. Additionally, such information is accessible while the user remains within the environment of interest without having to return to a computer system located in a back office or other remote location, thus resulting in significant time savings.

Figure 7:
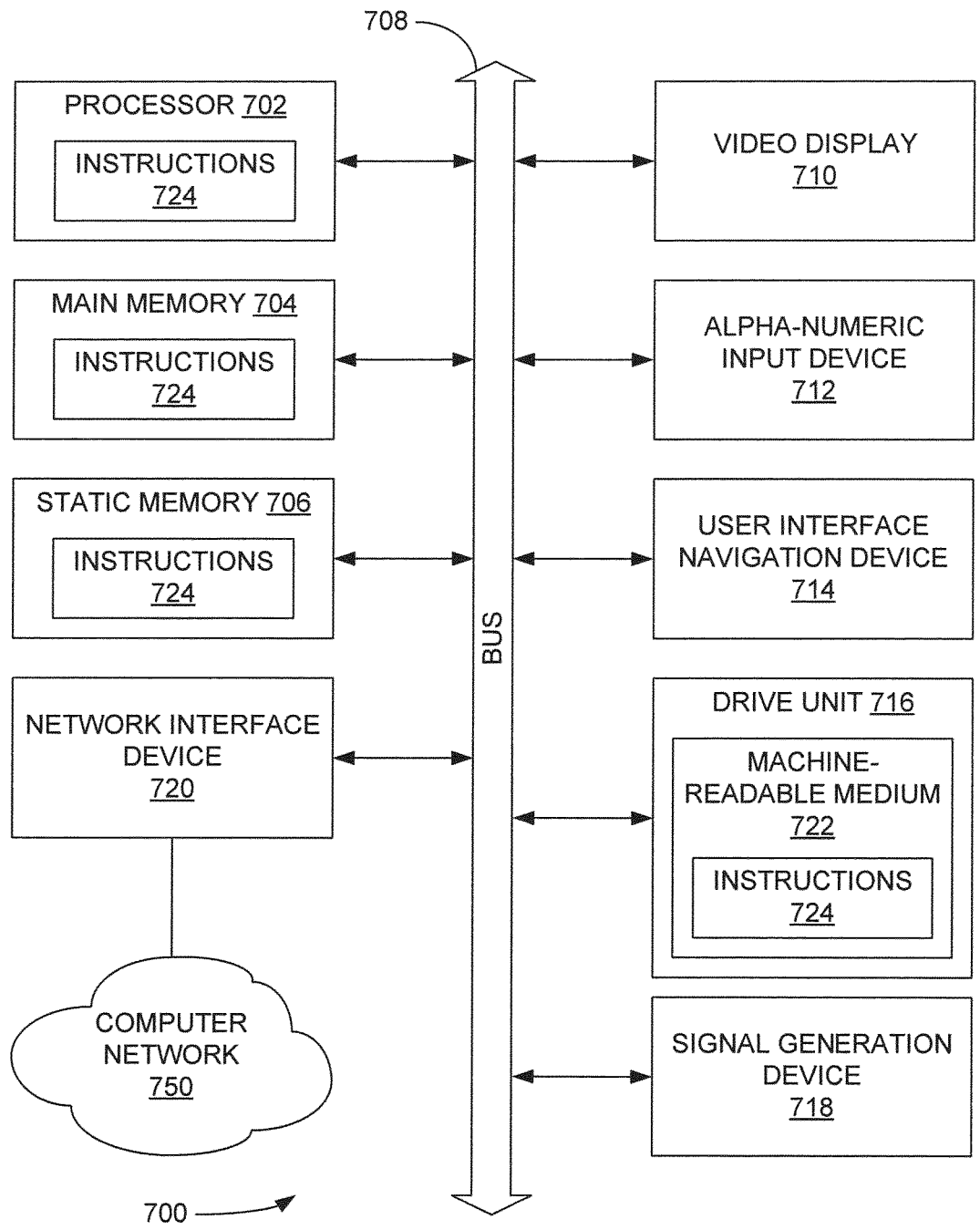
FIG. 7 is a block diagram of a machine in the example form of a processing system within which may be executed a set of instructions for causing the machine to perform any one or more of the methodologies discussed herein.

FIG. 7 depicts a block diagram of a machine in the example form of a processing system 700 within which may be executed a set of instructions 724 for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 700 includes a processor 702 (e.g., a central processing unit (CPU), a graphics processing unit (GPU), or both), a main memory 704 (e.g., random access memory), and static memory 706 (e.g., static random-access memory), which communicate with each other via bus 708. The processing system 700 may further include video display unit 710 (e.g., a plasma display, a liquid crystal display (LCD), or a cathode ray tube (CRT)). The processing system 700 also includes an alphanumeric input device 712 (e.g., a keyboard), a user interface (UI) navigation device 714 (e.g., a mouse), a disk drive unit 716, a signal generation device 718 (e.g., a speaker), and a network interface device 720.

The disk drive unit 716 (a type of non-volatile memory storage) includes a machine-readable medium 722 on which is stored one or more sets of data structures and instructions 724 (e.g., software) embodying or utilized by any one or more of the methodologies or functions described herein. The data structures and instructions 724 may also reside, completely or at least partially, within the main memory 704, the static memory 706, and/or within the processor 702 during execution thereof by processing system 700, with the main memory 704 and processor 702 also constituting machine-readable, tangible media.

The data structures and instructions 724 may further be transmitted or received over a computer network 750 via network interface device 720 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 700) or one or more hardware modules of a computer system (e.g., a processor 702 or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (for example, as a specialpurpose processor, such as a field-programmable gate array (FPGA) or an application-specific integrated circuit (ASIC)) to perform certain operations. A hardware module may also include programmable logic or circuitry (for example, as encompassed within a general-purpose processor 702 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose processor 702 that is configured using software, the general-purpose processor 702 may be configured as respective different hardware modules at different times. Software may accordingly configure a processor 702, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 702 or processor-implemented modules. The performance of certain of the operations may be distributed among the one or more processors 702, not only residing within a single machine but deployed across a number of machines. In some example embodiments, the processors 702 may be located in a single location (e.g., within a home environment, within an office environment, or as a server farm), while in other embodiments, the processors 702 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method, comprising:
receiving one or more identifiers at a mobile communication device, at least one of the identifiers indicating an item location of a selected item;
transmitting a search request including the identifier from the mobile communication device to an enterprise resource planning system, the search request being substantially limited to items present at the item location by using the identifier indicating the item location of the selected item;
receiving at the mobile communication device from the enterprise resource planning system information descriptive of at least one item in response to the search request;
presenting the information to a user of the mobile communication device;
receiving at the mobile communication device a command from the user to generate a message populated with at least a portion of the information; and
automatically generating the populated message in the mobile communication device with the portion of the information in response to receiving the command, wherein the population of the message is performed automatically.

2. The method of claim 1, the receiving of the identifier comprising scanning, using the mobile communication device, a graphical representation of the identifier.

3. The method of claim 2, the graphical representation comprising one of a barcode, a quick response code, and a set of alphanumeric characters.

4. The method of claim 1, at least one of the identifiers comprising one of an identifier for the at least one item, an identifier for a batch of manufactured items comprising the at least one item, and an identifier for an order for a manufactured item including the at least one item.

5. The method of claim 1, the information comprising an image of the at least one item.

6. The method of claim 1, the information comprising data pertaining to at least one characteristic of a batch of manufactured items comprising the at least one item.

7. The method of claim 1, the information comprising data pertaining to an order for a manufactured item comprising the at least one item.

8. The method of claim 7, the information comprising identification of each of a plurality of manufacturing operations associated with the order and an indication of progress of the at least one item through each of the plurality of manufacturing operations.

9. The method of claim 7, the information comprising an indication of a selectable configuration for the manufactured item comprising the at least one item.

10. The method of claim 1, the message comprising an email message, the generating of the message comprising automatically opening an email client provided in the mobile communication device and performing the automatic population of the message via the email client.

11. The method of claim 1, the message comprising a short message service message, the generating of the message comprising automatically opening a short message service client provided in the mobile communication device and performing the automatic population of the message via the short message service client.

12. A non-transitory computer-readable storage medium comprising instructions that, when executed by at least one processor of a machine, cause the machine to perform operations comprising:
capturing at a mobile communication device a graphical representation of an identifier of a selected item;
determining at the mobile communication device the identifier from the captured graphical representation and an identifier indicating an item location of the selected item;
transmitting a search request including the identifier of the selected item from the mobile communication device to an enterprise resource planning system, the search request being substantially limited to items present at the item location by using the identifier indicating the item location of the selected item;
receiving at the mobile communication device from the enterprise resource planning system information descriptive of at least one item in response to the search request;
presenting the information to a user via the mobile communication device;
receiving at the mobile communication device a command from the user to generate a message populated with at least a portion of the information; and
automatically generating the populated message in the mobile communication device with the portion of the information in response to receiving the command, wherein the population of the message is performed automatically.

13. A mobile communication device comprising:
an image capture component to capture a graphical representation of an identifier of a selected item;
an input interface to receive a command from a user to initiate the capturing of the graphical representation and receive at the mobile communication device a command from the user to generate a message;
a network interface to transmit a search request including the identifier of a selected item to an enterprise resource planning system, and to receive information descriptive of at least one item from the enterprise resource planning system, the search request being substantially limited to items present at an item location of a selected item by using an identifier indicating the item location;
an output interface to present the information descriptive of the at least one item to the user;
at least one processor; and
a memory to store an application comprising modules to be executed by the at least one processor, the modules comprising:
an item identifier capture module to determine the identifier of a selected item from the graphical representation;
an item data access library to generate the search request according to a format understandable by the enterprise resource planning system;
an item data presentation module to present the information descriptive of the at least one item to the user via the output interface; and
a message generation module to automatically generate the message in the mobile communication device, the generated message being automatically populated with at least a portion of the descriptive information in response to receiving the command to generate the message.

14. The mobile communication device of claim 13, the graphical representation comprising one of a barcode, a quick response code, and a set of alphanumeric characters.

15. The mobile communication device of claim 13, the message comprising an email message, the item data share module to generate the message by automatically opening an email client provided in the mobile communication device and performing the automatic generation of the message via the email client.

16. The mobile communication device of claim 13, the message comprising a short message service message, the item data share module to generate the message by automatically opening a short message service client provided in the mobile communication device and performing the automatic generation of the message via the short message service client.

17. The mobile communication device of claim 13, the modules further comprising a configuration module to receive a selection of a location of the at least one item, the search request to include the selection of the location.

* * * * *